Sept. 7, 1926.  
C. A. CAMPBELL ET AL  
1,599,206

RETAINING VALVE

Filed Oct. 10, 1925

Inventors:  
Charles A. Campbell,  
Erwin C. Vroman  
By Dodge  
Attorneys.

Patented Sept. 7, 1926.

1,599,206

UNITED STATES PATENT OFFICE.

CHARLES A. CAMPBELL AND ERWIN C. VROMAN, OF WATERTOWN, NEW YORK, ASSIGNORS TO THE NEW YORK AIR BRAKE COMPANY, A CORPORATION OF NEW JERSEY.

RETAINING VALVE.

Application filed October 10, 1925. Serial No. 61,740.

This invention relates to pressure relief valves and particularly to retaining valves for air brakes.

As is well understood in the air brake art, a retaining valve is a loaded valve which is applied to the exhaust port of the brake cylinder and which may be set in either an operative or an inoperative position. In the inoperative position it offers a free exhaust to the atmosphere. This is the normal position. In the operative position the valve functions to maintain a definite pressure in the brake cylinder. The retaining valves are set to this second position manually on long grades to hold pressure on the brake cylinders while the engineer recharges the reservoirs, since release is normally simultaneous with recharge.

The usual spring loaded retaining valve if used to retain low pressure opens and closes sluggishly and is apt to be held partly open by small particles of grit or scale. The object of the present invention is to produce a much more refined type of valve which will open and close quickly, which can be relied upon to seat tightly when it closes, and which requires little or no maintenance care.

To accomplish this result, the valve seat is made in the form of a narrow annular rib and the valve is a flexible metallic diaphragm. The valve seat is of such size relatively to the total area of the diaphragm that when the valve opens there is a considerably increased area of diaphragm subject to the pressure of the discharging air. This pressure is rendered effective by a restricted exhaust port in the vent passage beyond the valve. As soon as the valve starts to open, the restriction causes back pressure to build up on the diaphragm and this, with the increased area exposed, causes immediate wide opening of the valve. In the closing action, as soon as the throttling action between the valve and the seat exceeds the throttling action of the vent port, the valve closes sharply, because then the valve port acts to bleed away a part of the pressure effective to hold the valve open.

The preferred embodiment of the invention is illustrated in the accompanying drawings, in which Fig. 1 is a view partly in elevation and partly in section on the line 1—1 of Fig. 2. In this view the control cock is in its normal position, in which the exhaust passage is connected direct to atmosphere and the retaining valve is cut off;

The body of the valve casing is shown at 6 and is provided with perforated ears 7 by means of which it may be attached. The remainder of the valve casing consists of a bonnet 8 threaded in the top of the body 6 and a cap 9 threaded into the top of the bonnet 8.

Figure 1:
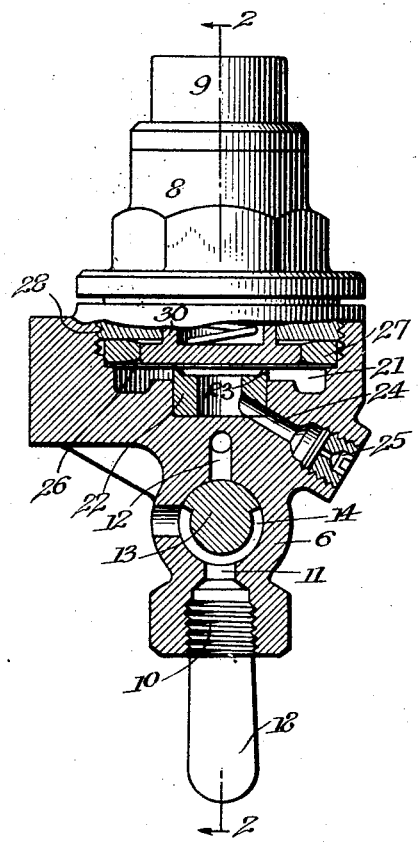
Figure 2:
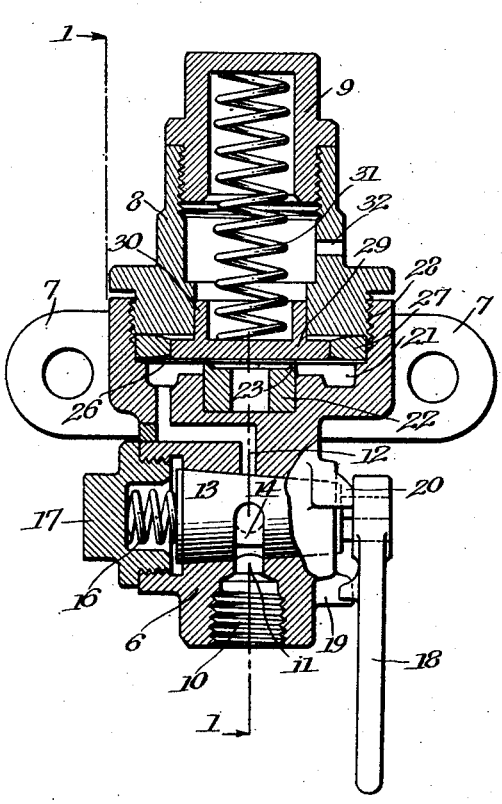
Fig. 2 is a section on the line 2—2 of Fig. 1.
Figure 3:
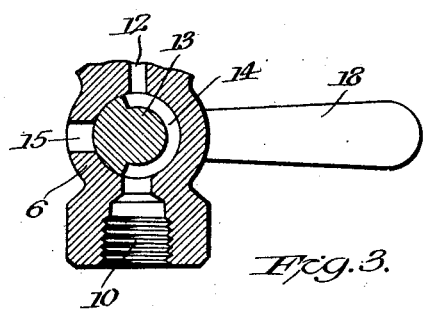
Fig. 3 is a fragmentary section similar to a portion of Fig. 1 and showing the control cock in position to direct the brake cylinder exhaust through the retaining valve.

At the lower end of the body 6 there is a threaded fitting 10 to which the exhaust pipe from the brake cylinder (not shown) is connected. This leads to a port 11. Communication from the port 11 to a continuation port 12 is controlled by a plug cock 13 which is provided with a grooved port 14 extending somewhat more than half way around its periphery. In one position of the plug 13 (that shown in Fig. 3) the port 14 connects the ports 11 and 12, thus putting the retaining valve into action. In the other position of the cock 13, the port 14 connects the port 11 with the exhaust port 15. This position is shown in Figs. 1 and 2 and is the normal position of the device, the retaining valve being then out of action.

The cock 13 is of usual construction, being seated by a spring 16 confined by a threaded cap 17. The valve is rotated by means of a handle 18 which swings between limiting positions defined by stops 19 and 20.

The port 12 leads to a valve chamber 21 in which is mounted an annular seat member 22 formed with an upstanding rib 23 which serves as the valve seat. The seat member 22 is renewable and is provided with a valve port 24 leading from its center to the atmosphere through a choke or restriction formed in a member 25 which is threaded into the body 6 of the valve. The construction of the valve seat member and the choke is clearly shown in Fig. 1.

The valve member coacting with the seat rib 23 on the seat member 22 is a metallic diaphragm 26 which is locked in position beneath a clamp ring 27 which is pressed down by the lower end of the bonnet 8. As stated, the bonnet 8 is threaded into the body 6 at 28 and thus serves as a threaded clamping member for the ring 27 and diaphragm 26.

A thrust member 29 is mounted within the clamp ring 27 so as to contact with the entire face of the diaphragm within the ring. The thrust member 29 is formed with an upwardly extending flange 30 which slides in a guideway in the bonnet 8. The parts are so arranged that the thrust member 29 is confined so that it has a simple straight line sliding motion quite limited in extent, but sufficient to permit the diaphragm to flex under pressure in the chamber 21 and move away from the seat rib 23.

The clamp ring 27 is recessed on its lower face with a convex curvature designed to impart a gradual flexure curve to the diaphragm. It is preferred to make the two opposed surfaces of the ring 27 alike so that it may be reversed, but this obviously is not essential.

The thrust member 29 is urged downward by a spring 31 which seats against the member 29 at one end within the flange 30 and which is confined at its other end by the cap 9. As stated, the cap 9 is threaded into the bonnet 8 and hence is removable to permit an interchange of springs. The space above the diaphragm 26 is vented to the atmosphere and this is conveniently accomplished by a vent port 32 which is shown as formed in the bonnet. It obviously might be otherwise located.

When the cock 13 is in the position shown in Fig. 1, the retaining valve is cut out and the brake cylinder exhausts normally to the atmosphere through the port 15. When the cock 13 is in the position shown in Fig. 3, the port 15 is closed and the exhaust is directed through the ports 11 and 12 to the valve chamber 21.

If the pressure in the chamber 21 is inadequate when acting on the diaphragm outside of the seat rib 23 to overpower the spring 31, the valve remains closed. If the brake cylinder pressure is greater, however, the diaphragm 26 will move up, allowing flow to start through port 24 to choke 25. If this flow is greater than the capacity of choke 25, back pressure will build up in the port 24 and the entire area of diaphragm 26 becomes effective, thus causing the valve to open wide. As the brake cylinder pressure gradually falls, the diaphragm 26 will approach the seat rib 23 gradually and ultimately a position will be reached when the throttling between the diaphragm and the seat rib exceeds the throttling in the choke 25. When this occurs, the pressure on that area of the diaphragm included within the seat rib will drop quite rapidly and consequently the spring 31 will quickly overpower the diaphragm and seat it upon the rib 23.

This quick opening and quick seating characteristic is important because it gives prompt venting of the brake cylinders to the desired retained pressure and because it ensures tight seating of the retaining valve. The valve seat rib has a narrow edge, so that small particles of scale or dust have almost no opportunity to become lodged on the seat. This fact, coupled with the flexibility of the diaphragm, ensures tight seating without undue maintenance care.

While the arrangement illustrated is preferred, it is obvious that changes may be made from the specific embodiment shown without sacrifice of the advantages enumerated and consequently no limitation to the specific structure shown is intended except to the extent specified in the claims.

What is claimed is:

1. In a retaining valve, the combination of an annular valve seat; a flexible diaphragm valve coacting therewith and having a total effective area larger than the area included within the margins of said valve seat; resilient means urging said diaphragm toward said seat; and flow restricting means located on the discharge side of said valve and arranged to restrict the outflow through the valve to an amount less than the maximum capacity of the valve.

2. In a retaining valve, the combination of a valve seat comprising a narrow annular rib; a flexible diaphragm valve adapted to seat against said rib and having an effective area materially greater than the area included within said rib; resilient means urging said diaphragm toward said seat; and flow restricting means located on the discharge side of said valve and arranged to restrict the outflow through the valve to an amount less than the maximum capacity of the valve.

3. In a retaining valve, the combination of a body formed with a retaining valve chamber, an atmospheric port, and a port for connection with the exhaust port of a brake cylinder; a cock shiftable between two positions, in one of which it connects the last-named connection with said atmospheric port, and in the other of which it closes said atmospheric port and connects said connection with said retaining valve chamber; a narrow annular rib in said chamber serving as a valve seat; a metallic diaphragm of greater diameter than said valve seat, said diaphragm being also mounted in said chamber and subject to the pressure therein; a spring urging said diaphragm into contact with said rib; and means for affording a restricted flow of fluid from said valve seat within said rib, the rate of such restricted flow being less than the maximum flow capacity between the seat and the diaphragm.

4. In a brake retainer, the combination of a loaded valve subject in an opening direction to the pressure of brake cylinder exhaust, and arranged to present an increased effective area to such pressure in an opening direction when open; and a constriction in the flow path beyond said valve, said constriction serving to throttle the flow to a rate less than the maximum capacity of said valve.

In testimony whereof we have signed our names to this specification.

CHARLES A. CAMPBELL.
ERWIN C. VROMAN.